M. E. Burlingame,
Clothes Pin.
No. 93,672. Patented Aug. 17, 1869.
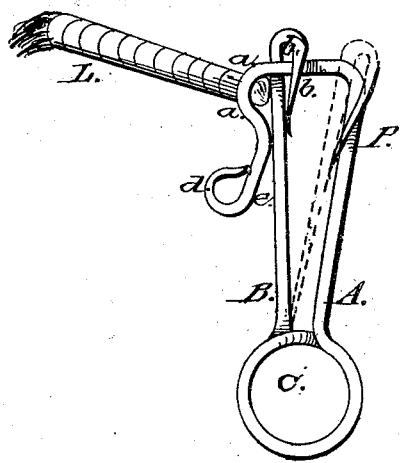
Witnesses:
E. F. Nichols
S. C. Dyer
Inventor:
M. E. Burlingame

United States Patent Office.

M. E. BURLINGAME, OF WILLETT, NEW YORK.

Letters Patent No. 93,672, dated August 17, 1869.

---

IMPROVED CLOTHES-PIN.

---

The Schedule referred to in these Letters Patent and making part of the same.

---

*To all whom it may concern:*

Be it known that I, M. E. BURLINGAME, of Willett, in Cortland county, and State of New York, have invented a new and improved Clothes-Pin, or hook for fastening clothes upon a line to dry after washing; and I do hereby declare that the following is a full and exact description of the same, reference being had to the accompanying drawing, and letters of reference thereon, making part of this specification.

The drawing shows a perspective view of my improved clothes-pin or hook, as it appears placed upon the clothes-line.

My invention consists in constructing, in a new and novel form, from a single piece of elastic wire, a cheap and efficient clothes-pin or hook, so shaped as to adjust itself to any-sized clothes-line, and, in consequence of this peculiar form, it can be attached to the line, or detached from it as readily, yet, at the same time, will hold the clothes on to the line more securely than any clothes-pin known, it being a well-known fact that all other clothes-pins, while in use, project from three to six inches above the line of clothes, and a slight pressure against the upper portion of such pins will wrench them from the line, thereby allowing the clothes to fall to the ground, in consequence of which they are often soiled or carried away by the wind. Even the weight of the clothes, if carried by the wind over the top of such pins, almost invariably produces this effect, while my improved pin, being in the form of a hook, and projecting below the line by the side of the clothes, cannot be accidentally detached from the line of clothes.

To enable others skilled in the art to make and use my invention, I will describe the construction and operation thereof.

I take elastic wire, of a proper size, and coil it one or more times around a mandrel, to form the coil-spring C, having arm A, of sufficient length to form a hook, as shown in the drawing, said hook having a recess for receiving the clothes-line L, as shown at *a a;* thence carried downward and outward, terminating in coil *d*, which will prevent the end of the hook from being thrust through the clothes in the act of putting said pin or hook on to the line of clothes.

The arm B terminates in a loop, which encircles arm A, as shown at *b b*, and used to retain the clothes-line L in recess *a a*.

Operation.

The operation will be as follows:

The washer-woman, after placing the clothes upon the line, will take the pin or hook into the hand, and place the line in the aperture *e*, between the arms A and B; then press the pin or hook gently downward, until the line L enters recess *a a*, where it will be retained by the reaction of spring C, on arm B.

To remove the pin or hook from the line, reverse the operation of putting on.

This mode of operating is recommended, unless the clothes are very thin or rotten, when it will be best to press back arm B until the line and clothes can easily enter recess *a a*.

What I claim as my improvement in clothes-pin or hook, is—

The coiled-wire spring, in one piece, in form as shown C B A P, guide-hook *b*, and catch, or holder, *d, a*, and *e*, as shown and described.

M. E. BURLINGAME.

Witnesses:
ELISHA F. NICHOLS,
S. C. DYER.